United States Patent
Polo Filisan et al.

(10) Patent No.: US 10,352,961 B2
(45) Date of Patent: Jul. 16, 2019

(54) TEST BENCH, IN PARTICULAR FOR ACCELEROMETERS

(71) Applicant: Snecma, Paris (FR)

(72) Inventors: Gilles Polo Filisan, Moissy-Cramayel (FR); Yohann Chusseau, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/107,028

(22) PCT Filed: Dec. 23, 2014

(86) PCT No.: PCT/FR2014/053545
§ 371 (c)(1),
(2) Date: Jun. 21, 2016

(87) PCT Pub. No.: WO2015/097412
PCT Pub. Date: Jul. 2, 2015

(65) Prior Publication Data
US 2018/0196083 A1    Jul. 12, 2018

(30) Foreign Application Priority Data
Dec. 23, 2013    (FR) ...................................... 13 63486

(51) Int. Cl.
*G01P 21/00*    (2006.01)
(52) U.S. Cl.
CPC .................................. *G01P 21/00* (2013.01)

(58) Field of Classification Search
CPC ....................................................... G01P 21/00
See application file for complete search history.

(56) References Cited

U.S. PATENT DOCUMENTS

| | | | |
|---|---|---|---|
| 2004/0040896 A1* | 3/2004 | Koutsky | B07B 1/46 209/417 |
| 2007/0295087 A1 | 12/2007 | Umeda | |
| 2010/0225433 A1* | 9/2010 | Dunlap | H01F 27/325 336/197 |
| 2012/0103094 A1* | 5/2012 | Tustaniwskyj | G01M 7/022 73/514.29 |
| 2013/0031983 A1* | 2/2013 | Provost | G01M 7/02 73/665 |
| 2014/0277911 A1* | 9/2014 | Chinnadurai | G07C 5/008 701/31.4 |

FOREIGN PATENT DOCUMENTS

| | | |
|---|---|---|
| EP | 0 694 785 A1 | 1/1996 |
| EP | 2 063 275 A2 | 5/2009 |
| WO | WO 88/06541 A1 | 9/1988 |

* cited by examiner

*Primary Examiner* — Son T Le
*Assistant Examiner* — Herbert K Roberts
(74) *Attorney, Agent, or Firm* — Blank Rome LLP

(57) ABSTRACT

A test bench comprising at least one accelerometer which is linked by rigid mechanical linking to a support and comprising a vibration chamber able to convert an electrical signal into a mechanical vibration disseminated to the support and to the accelerometer by rigid mechanical linking between an oscillating part of the vibration chamber and the support in such a way as to use the support as an acoustic amplifier and to excite the accelerometer according to a predetermined mechanical wave.

11 Claims, 2 Drawing Sheets

TEST BENCH, IN PARTICULAR FOR ACCELEROMETERS

Figure 1:
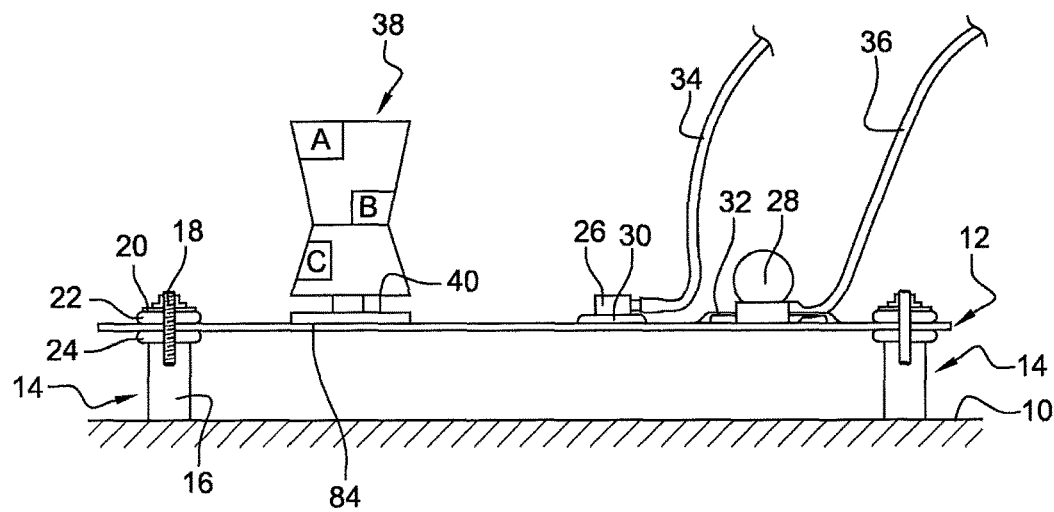

The present invention concerns an accelerometer test bench, in particular within the context of simulations on a turbine engine regulation system.

A turbine engine, such as a turbofan or a turboprop, generally comprises a set of regulation systems capable of measuring various different operating parameters of the turbine engine, such as the temperatures, pressures, flow rates and rotation speeds in addition to commanding the means of control of the turbine engine as a function of these parameters and adjustments performed by a user, in order to ensure optimum use of the turbine engine.

Within the context of design and control of these regulation systems, the latter need to be tested outside the turbine engine, in order for example to monitoring their functioning in environments difficult to simulate on a complete turbine engine. One of these environments corresponds to exposure to electromagnetic interferences, which may be of variable intensities, from a source external to the regulation systems. In these cases, the resistance and reactions of the regulation systems to these electromagnetic interferences are tested in an environment reproducing the turbine engine as closely as possible. This type of test is known as an electromagnetic compatibility test.

In order to simulate the environment corresponding to the turbine engine, each of the sensors of the regulation systems is stimulated separately using test benches devoted on the one hand to reproducing physical quantities and exciting the sensors, in a similar manner to the excitation within the turbine engine and on the other hand, to measuring the data derived from the sensors. Ideally, these test benches should be electromagnetically shielded so as to avoid being subject to the aforementioned simulated electromagnetic interferences and in order to avoid constituting in themselves a source of electromagnetic interferences for the sensors.

In particular, some of the sensors of the regulation systems are accelerometers devoted to measuring the vibrations of the turbine engine during operation, wherein these vibrations are correlated with the rotation speeds of the rotating elements of the turbine engine.

In order to excite the accelerometers of the regulation systems and reproduce the vibrations of the turbine engine, use of shaker units has been considered, supplied with a high-power alternating signal derived from an external amplifier, a controller and a signal generator, in order to induce vibration of a plate of the shaker unit. Shaker units are however very costly, bulky and limited in flexibility, complicated to implement owing to adjustment of the external amplifier, consume a large amount of electricity and are highly susceptible to the electromagnetic interactions mentioned above. Hence, shaker units do not represent solutions appropriate to the context mentioned in this patent application.

The aim of the invention is in particular to provide a simple, effective and economical solution to this problem.

To this end, it proposes a test bench comprising:
- at least one accelerometer which is linked by rigid mechanical linking to a support and
- a vibration chamber able to convert an electrical signal into a mechanical vibration disseminated to the support and to the accelerometer by rigid mechanical linking between an oscillating part of the vibration chamber and the support in such a way as to use the support as an acoustic amplifier and to excite the accelerometer according to a predetermined mechanical wave.

The support is therefore necessarily capable of propagating internally, through its own deformation, a sound wave derived from oscillation of the vibration chamber and moreover at least reaching the accelerometer. The type of vibration chamber mentioned corresponds for example to that marketed by the trademark Adin. By means of the invention, it is possible to dispense with a complex system that requires a major source of power. Since the vibration chamber of the invention uses a support as an acoustic amplifier, the resources required for operating the test bench are highly simplified, thereby obviating the need for an external electrical amplifier and related complex adjustments. Finally, in view of the few resources used, the vibration chamber can be relatively small-sized, thereby allowing the test bench to be flexible and permits easier electromagnetic shielding of the vibration chamber. For the same reasons, the proposed test bench is much less expensive to achieve than a shaker unit of the prior art.

The invention may equally be presented as a process for exciting an accelerometer comprising stages involving
- connecting an accelerometer to a support by rigid mechanical linking,
- connecting by rigid mechanical linking to said support an oscillating part of a vibration chamber able to convert an electrical signal into a mechanical vibration imparted to the oscillating part and
- disseminating to the support and to the accelerometer by internal propagation in the support (through its own deformation) a sound wave derived from oscillation of the vibration chamber at least reaching the accelerometer, so as to excite the accelerometer according to a predetermined mechanical wave.

Advantageously, the vibration chamber comprises its own source of power supply in the form of a rechargeable battery. It is not therefore necessary to connect the vibration chamber to an external source of power by means of cables. Electric cables are undesirable elements in a test bench, as they make electromagnetic shielding of the test bench difficult and are detrimental to the flexible aspect of the test bench.

Preferentially, the electrical signal has been amplified by the vibration chamber by means of the power supply. The electrical signal possesses in this case, before conversion into mechanical vibration, a power included in a preferred case between 3 W and 50 W. The power can be adjusted in order to be able to modify the intensity of the vibrations to be amplified by the support and detected by the accelerometer.

Building the signal from a digital-type computerised source will be privileged.

Preferentially, the vibration chamber comprises a digital memory, non-volatile in particular, in which at least one computerised file is stored in an audio format, in addition to means of converting said files into the electrical signal and subsequently into the mechanical vibration of the oscillating part. In a preferred case and for the needs of specific tests, the computerised file contains an element of data of an audio signal, the frequencies of which correspond to the rotation frequencies of elements rotating within a turbine engine, such as low-pressure and high-pressure rotors. When the vibration chamber includes a battery and a digital memory as mentioned above, the test bench can be completely independent, thereby extensively facilitating its installation and electromagnetic integration.

According to another characteristic, the oscillating part of the vibration chamber rests flat on the support and is maintained on said support by adhesion or suction.

The support may form a box on one wall of which the accelerometer is connected to the outside of the box and on one wall of which the oscillating part of the vibration chamber is connected to the inside of the box.

Preferentially, the accelerometer and the oscillating part of the vibration chamber are in contact with the same wall of the box. Thus, transmission of the vibrations between the vibration chamber and the accelerometer is optimum, without any change of mechanical interface.

According to a possible embodiment, means of power supply and/or generation of the electrical signal are connected to the vibration chamber. In the event that a box is used, said means of power supply and/or generation of the electrical signal are arranged outside the box and pass through the box. This embodiment will be useful for example when the battery does not provide sufficient autonomy and/or when wishes to control the electrical system in real time.

The box may be made of conductive metal and may be arranged so as to be completely closed. The box may thus serve as a Faraday cage.

According to one characteristic considered, the box comprises a mobile wall for opening and closing the box allowing access to the vibration chamber, wherein this mobile wall is linked to the other walls of the box by means of at least one electromagnetic compatibility seal when the box is in a closed state. This allows installation/deinstallation of the vibration chamber in/from the box without harming its electromagnetic shielding.

According to one advantageous embodiment, one of the walls of the box is cylindrical with ends axially closed by two end walls, each perpendicular to the cylindrical wall. One of these end walls, formed for example by the support, is preferably linked to the accelerometer and the vibration chamber. The end wall mentioned above may furthermore comprise at least one concentric circular groove so as to provide said vibrating wall greater flexibility.

In order to concentrate the vibratory energy at the box, the latter may be arranged on a bench by means of at least one shock absorber.

The invention also concerns a process for vibrational excitation and measurement of an accelerometer comprising stages involving:
  forming a test bench as described above,
  giving the vibration chamber an electrical signal to interpret, containing an element of audio data, so as to induce vibration of the support and accelerometer according to a corresponding sound wave and
  measuring the acceleration values detected by the accelerometer.

Advantageously, this process for vibrational excitation of an accelerometer furthermore comprises the stages involving:
  providing as audio data at least one rotation frequency of a running turbine engine,
  subjecting the test bench to external electromagnetic interferences.

Figure 2:
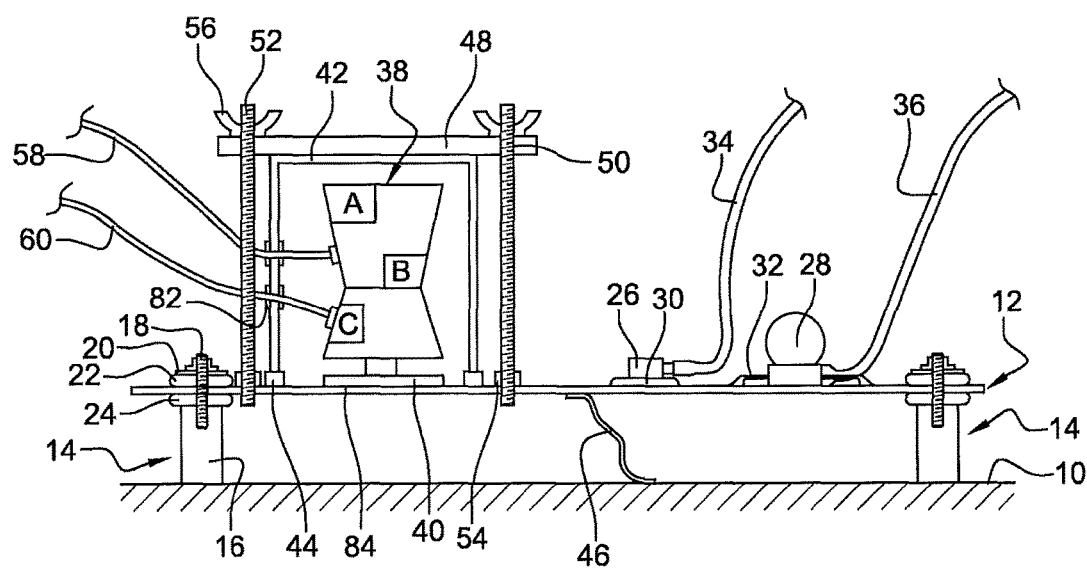
Figure 3:
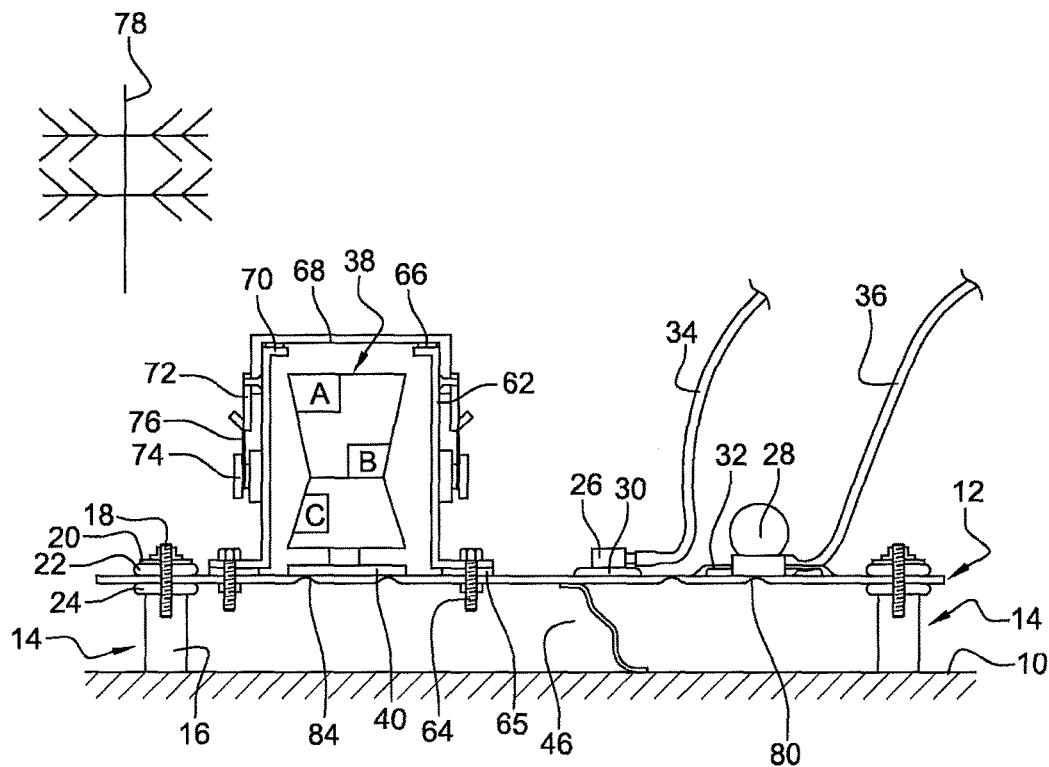
Figure 4:
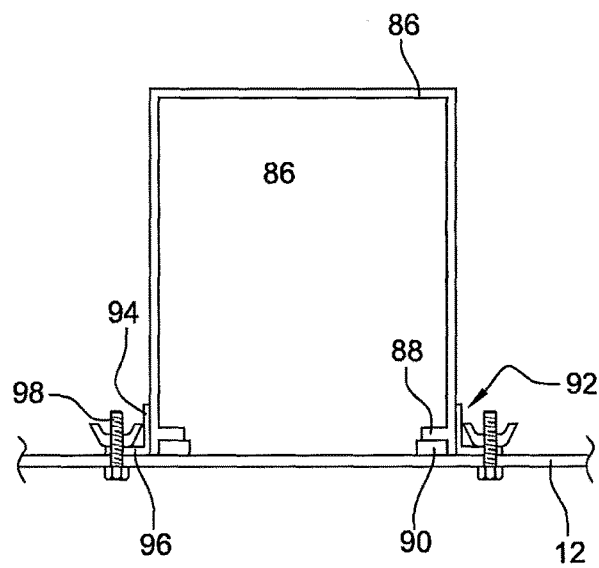

The invention will be better understood and other details, characteristics and advantages thereof will become more clearly apparent in reading the following description, given by way of a non-restrictive example with reference to the appended drawings in which:

FIG. 1 is a cross-sectional schematic view of a first embodiment of a test bench proposed in this application, FIG. 2 is a cross-sectional schematic view of a second embodiment of a test bench proposed in this application, FIG. 3 is a cross-sectional schematic view of a third embodiment of a test bench proposed in this application, FIG. 4 is a cross-sectional schematic view of an embodiment of an electromagnetic protection box of a vibration chamber.

Reference will be made first of all to FIG. 1 which illustrates a test bench as introduced above and in which the vibration chamber is not arranged in a box.

A bench 10 connected to the earth is used for installation of the test bench. The support 12 comes in the form of a conductive metal plate, the thickness of which may vary between 0.5 mm and 1 cm and sufficiently large in size in order to receive the different elements of the test bench. The diagonal of the support will typically be between 10 cm and 150 cm. Feet 14 are mounted on the lateral edges of the support 12 in order to position the support 12 on the bench 10. These ranges of dimensions are however provided by way of examples and are not limitative, provided that the invention remains functional.

Each foot 14 comprises a cylindrical bar 16, one end face of which features a bore to allow passage of a screw 18. In order to maintain the cylindrical bar 16 in relation to the support 12, the screw passes through orifices formed successively through a washer 20, a first damping member 22, generally disc-shaped, the support 12, a second damping member 24 similar to the first and the bore of the cylindrical bar 16. This type of link between the feet 14 and the support 12 allows the support to vibrate freely when the test bench is set in operation. In the example illustrated in FIG. 1, the feet 14 are four in number, with the cylindrical bars 16 resting on the bench 10. Optionally, it is proposed to fix the feet 14 in the conventional manner on the bench 10. It is furthermore proposed to form only two feet 14 on a single side of the support 12, fixing these two feet on the bench 10. The side of the support 12 without feet is maintained in this case cantilevered over the bench 10. This other method of installation offers better freedom of movement of the support 12, which is thus better capable of transmitting vibrations.

Accelerometers 26, 28 are arranged by rigid mechanical linking on the support 12. Rigid mechanical linking implies in this case that this link is able to transmit sound vibrations, in other words mechanical vibrations, between both elements forming the link. The accelerometer 26 is connected to the support by means of a welding 30 and the accelerometer 28 by means of adhesives 32, in the example illustrated. A bolted link may also be used in another example. The accelerometers are linked by electrical cables 34, 36 to means of processing the measurements (not illustrated) performed during the tests.

A vibration chamber 38 is arranged by rigid mechanical linking on the support 12. This vibration chamber 38 comprises an oscillating part 40 fixed to the support 12 by suction, by means of a suction cup 84 for example, or by bonding. Any other rigid fixing method will of course be accepted. To this end, one may for example use an adhesive foil perforated in its centre so as to be arranged and adhesively applied around the oscillating part 40, wherein this foil also comprises a portion glued to the support 12 around the oscillating part 40. The vibration chamber preferably comprises an internal battery A to allow energy self-sufficiency of the test bench. The battery will generally be capable of providing independent operation ranging up to around fifteen hours, but its performances may evolve according to the developments in the field. The energy delivered by the battery will serve to generate the vibrations in the oscillating part 40. The vibration chamber 38 is furthermore capable of amplifying, by means of the energy source, an audio-type, e.g. musical, analog electrical signal, wherein this electrical signal corresponds to the acoustic signal, the data of which one wishes to transmit and subsequently convert this electrical signal into a vibration of the oscillating part reproducing this acoustic signal.

In the example illustrated in FIG. 1, the acoustic chamber 38 furthermore comprises an internal memory B for storing computerised files, for example an SD-type memory card and an operating system C allowing decoding of these digital-type computerised files into the aforementioned audio-type analog electrical signal. The computerised files can be encoded using an audio format commonly employed in data processing, of the WAVE-, MP3-, OGG-, AAC-, FLAC- or WMA-type, etc.

The analog electrical signal, produced following electrical amplification by the vibration chamber and used to generate the vibrations, has a power typically included between 3 W and 50 W in the present case. Powers differing from this range of values may of course be selected as a function of experimental requirements.

The vibration chamber described above is commercially available and is offered for example by the Adin company (trademark). Use of this vibration chamber within an optimised context of a test bench for the accelerometer test is particularly interesting, whereas vibration chambers are considered at present solely as a means for listening to music.

By means of the mechanical linking between the oscillating part 40 and the support 12, the support 12 acts as an acoustic amplifier for the mechanical vibration generated by the vibration chamber 38. The mechanical vibration thus disseminates throughout the entire support 12, reaching the accelerometers 26, 28 which are able to measure this vibration.

The vibration chamber 38 is particularly suitable for generating an acoustic signal within the frequencies audible to the human ear. These frequencies appreciably correspond to the frequencies of the vibrations present in a turbine engine, such as the rotation frequencies of the respectively high-pressure and low-pressure rotors, thereby making the vibration chamber suitable for simulating such vibrations. The audio signal processed by the vibration chamber and used for the tests and the data of which is contained for example in the aforementioned computerised file, will therefore advantageously reproduce these characteristic frequencies of the turbine engine.

Reference will now be made to FIG. 2, which furthermore proposes formation of a box that creates electromagnetic shielding around the vibration chamber.

A cylindrical pot 42 made of conductive metal is mounted inverted on the support 12, above the vibration chamber 38. A circular electromagnetic compatibility seal (so-called EMC seal) 44 is arranged at the interface between the cylindrical pot 42 and the support 12. The cylindrical pot 42 is held tightly against the support 12 by means of a shaft 48, a crossways support from the outside against the bottom of the cylindrical pot 42. This shaft comprises two orifices 50 oriented towards the support and through which two threaded rods 52 pass respectively, two respective ends of which are inserted in nuts 54 fixed to the support 12. On the other side of the shaft 48 in relation to the rods 52, wing nuts 56 are respectively mounted on the rods 52. By screwing the wing nuts 56 on to the rods 52, the shaft 48 is then pressed against the bottom of the cylindrical pot 42 so as to clamp the latter on the support 12.

Thus, the assembly formed by the metallic cylindrical pot 42 and the support 12 forms a conductive metal cage around the vibration chamber and acts via the principle of a Faraday cage. Furthermore, the conductive metallic junction 46 is formed for example by a foil or a braid between the support 12 and the bench 10 in order to connect the aforementioned case to the earth. Hence, the electromagnetic field generated by the vibration chamber during operation remains enclosed in this cage and does not interfere with the accelerometers.

It will be noted that the example above designed to form a Faraday cage around the vibration chamber is not limitative. Generally speaking and using various means familiar in the technology, it will at least be intended to form a Faraday cage shielding the vibration chamber from its environment with regard to the electromagnetic waves generated within the test bench. Using a support in order to propagate the vibrations generated by the vibration chamber to the accelerometer allows spatial separation of the vibration chamber from the accelerometer and therefore facilitates formation of a Faraday cage around the vibration chamber so as to electromagnetically shield the accelerometer.

In the example illustrated in FIG. 2, the vibration chamber 38 is connected to a power supply cable 58 and to a cable for transmission of an electrical signal 60 containing an element of audio data. These cables 58, 60 make it possible not to be constrained by the autonomy of the vibration chamber and to be able to control live the audio signal processed by the vibration chamber. This electrical signal containing an element of audio data may be either an analog signal that can be amplified by the vibration chamber or directly converted into the acoustic signal or a digital-type computerised electrical signal that can be decoded by an operating system C of the acoustic chamber into an analog electrical signal and subsequently into the acoustic signal. These cables 58, 60 are preferably screened in order to have electromagnetic shielding and pass for example through cable glands 82 formed on the cylindrical wall of the cylindrical pot 42.

FIG. 3 illustrates another embodiment of a Faraday cage around the vibration chamber.

An open cylinder 62 made of conductive metal is placed, around the vibration chamber 38, on the support 12. An external annular edge 63 extends perpendicularly from the end of the open cylinder 62 in contact against the support 12. This edge 63 comprises orifices aligned with orifices in the support 12 to allow passage of screws 64 for fixing the edge 63 on to the support 12. In order to increase flexibility of the structure and ensure that no waves pass under the edge 63, for instance in case of deformation of the plate 12 in relation to the edge 63, an annular elastic EMC seal 65 can be arranged between the edge 63 and the support 12.

An annular EMC seal 66 is arranged on an inner annular edge 70 of the end of the open cylinder 62 opposite the support 12. This seal 66 forms an interface between the open cylinder 62 and a conductive metal cover 68 placed on the last mentioned end of the cylinder 62. The circumference of the metallic cover 68 comprises hooks 72. Restrainers 74 are formed on the open cylinder 62, each comprising an annular groove. Relatively rigid elastics or metallic rings 76 force the hooks 72 against the restrainers 74. The elastics or metallic rings 76 are tensioned for example by a lever system at the restrainers 73. Thus, the cover 68 is held clamped against the end of the open cylinder 62 and electromagnetic sealing is obtained.

As in the example illustrated in FIG. 2, the aforementioned assembly forms a Faraday cage. Therefore, when an antenna 78 is used to generate an electromagnetic field, the characteristics of which are representative of the simulated external environments, in the vicinity of the test bench, the vibration chamber 38 does not suffer any interference. The electromagnetic field created by the antenna 78 simulates for example lightening or other elements (radar, mobile telephone antennas, etc.) and allows testing and verification of the function of the accelerometers 26, 28 subjected to the vibrations generated by the vibration chamber 38 and amplified by the support 12 and which simulate the vibrations of a turbine engine, in this specific environment.

In the example illustrated in FIG. 3, the independent means A, B of the vibration chamber are used with regard to the power supply and the source of data for generating the acoustic signal. Installation of the test bench is thus facilitated, since there is no need to create additional cable passages and there is no risk of electromagnetic leaks through the Faraday cage formed or the cables.

Circular grooves 80 have furthermore been formed on the surface of the support 12 in order to lend greater flexibility to the latter, thereby allowing better amplification of the acoustic vibrations developed by the oscillating part 40.

Reference will now be made to FIG. 4, which illustrates still another embodiment of a box forming a Faraday cage, designed to be arranged around the vibration chamber as described above.

The box in this case corresponds to a cylindrical pot 86 made of conductive metal inverted on the support 12. The pot 86 comprises an inner annular edge 88 close to its open end facing the support 12. An annular recess delimited by said edge 88 and the end of the pot 86, opposite the support 12 is formed in this manner. In this recess, an EMC seal 90 is arranged, the dimensions of which have been selected such that the latter assumes the shape of the housing while exceeding with a slight clearance the open end of the pot 86.

At least two or three tabs 92 at a right angle are regularly welded, distributed around the cylindrical pot 86. A first branch 94 of each tab 92 is welded on the outer face of the pot 86, at the open end of the pot 86 opposite the support 12 and a second branch 96 of each tab 92 at a right angle with the first branch 94 and extending perpendicularly to the cylindrical wall of the pot 86 and aligned with the open end of the pot 86. The second branches 96 comprise orifices aligned with orifices in the support 12 to allow passage of bolts 98.

When the bolts 98 are inserted and tightened, preferably using wing nuts arranged on the side of the pot 86 in order to facilitate installation, the cylindrical pot 86 is forced and clamped against the support 12. Thus, the EMC seal 90 which is arranged in the recess opposite the open end of the pot and projecting slightly from this end is flattened in the recess during tightening of the bolts 98 and provides optimum electromagnetic shielding between the support 12 and the cylindrical pot 86.

Although any box providing electromagnetic shielding around the vibration chamber may be suitable for the tests, it will be noted that the various different boxes described above are particularly suitable for very frequent installation and deinstallation, i.e. at least twice a day over several months, as they allow easy and rapid setup of the test bench. Without this constraint, it would be sufficient for example to screw and weld the box on to the support in the conventional manner. The examples of boxes described above are consequently not limitative, even though they are definitely of interest.

The invention claimed is:
1. A test bench comprising:
    at least one accelerometer which is linked by a first rigid mechanical linking to a support and
    a vibration chamber able to convert an electrical signal into a mechanical vibration disseminated to the support and to the accelerometer by a second rigid mechanical linking between an oscillating part of the vibration chamber and the support in such a way as to use the support as an acoustic amplifier and to excite the accelerometer according to a predetermined mechanical wave,
    wherein the support comprises a box made of a conductive metal so as to serve as a Faraday cage,
    wherein the box has at least one wall on which:
        the accelerometer is connected to an outside of the box, and
        the oscillating part of the vibration chamber is connected to an inside of the box, and
    wherein the support further comprises:
        a mobile wall for opening and closing the box, so that an access to the vibration chamber inside the box can be allowed, and
        an electromagnetic compatibility seal interposed between the mobile wall and the box, when the box is closed by said mobile wall.
2. The test bench according to claim 1, wherein the vibration chamber comprises a source of power supply of including a rechargeable battery.
3. The test bench according to claim 1, wherein the vibration chamber comprises a non-volatile digital memory, in which at least one computerised file is stored in an audio format, in addition to means of converting said files into the electrical signal and subsequently into the mechanical vibration of the oscillating part.
4. The test bench according to claim 1, wherein the oscillating part of the vibration chamber rests flat on the support and is maintained on said support by adhesion or suction.
5. The test bench according to claim 1, wherein the accelerometer and the oscillating part of the vibration chamber are in contact with the same wall of the box.
6. The test bench according claim 1, wherein one of the walls of the box is cylindrical with ends axially closed by two end walls each perpendicular to the cylindrical wall, wherein one of these end walls is connected to the accelerometer and to the vibration chamber.
7. A process for excitation of an accelerometer comprising:
    providing a box as a support adapted to be connected to an accelerometer, the box being made of a conductive metal so as to serve as a Faraday cage box and a mobile wall being provided for opening and closing the box, so that an access to a vibration chamber located inside the box can be allowed when the box is opened, and an electromagnetic compatibility seal being interposed between the mobile wall and the box, when the box is closed by said mobile wall,
    connecting the accelerometer to the box by a first rigid mechanical linking, the box being capable of propagating internally and amplifying, through a deformation, a sound wave at least reaching the accelerometer, the box having at least one wall on which the accelerometer is connected to an outside of the box,
    connecting to the inside of said box, by a second rigid mechanical linking, an oscillating part of the vibration chamber able to convert an electrical signal into a mechanical vibration, and
    disseminating to the support and to the accelerometer by internal propagation in the support, via the respective first and second rigid mechanical linking, a sound wave which comes from oscillation of the vibration chamber, so as to use the support as an acoustic amplifier and excite the accelerometer according to a predetermined mechanical wave.

8. A test bench comprising:
at least one accelerometer which is linked by a first rigid mechanical linking to a support and
a vibration chamber able to convert an electrical signal into a mechanical vibration disseminated to the support and to the accelerometer by a second rigid mechanical linking between an oscillating part of the vibration chamber and the support in such a way as to use the support as an acoustic amplifier and to excite the accelerometer according to a predetermined mechanical wave
wherein the support comprises a box and a mobile wall for opening and closing the box, so that an access to the vibration chamber disposed inside the box is allowed,
wherein the box has at least one wall on which the accelerometer is connected to an outside of the box and the oscillating part of the vibration chamber is connected to the inside of the box, and
wherein the mobile wall is linked to walls of the box by at least one electromagnetic compatibility seal when the box is closed by said mobile wall.

9. A process for vibrational excitation and measurement of an accelerometer comprising stages involving:
forming a test bench according to claim 8,
giving the vibration chamber an electrical signal to interpret, containing an element of audio data, so as to induce vibration of the support and accelerometer according to a corresponding sound wave and
measuring the acceleration values detected by the accelerometer.

10. The process for vibrational excitation of an accelerometer according to claim 9, further comprising the stages involving:
providing as audio data at least one rotation frequency of a running turbine engine,
subjecting the test bench to external electromagnetic interferences during the measurements.

11. A test bench comprising:
at least one accelerometer,
a support, and
a vibration chamber able to convert an electrical signal into a mechanical vibration disseminated to the support and to the accelerometer,
wherein an oscillating part of the vibration chamber and the accelerometer are both linked to the support, respectively by a first rigid mechanical linking and a second rigid mechanical linking, said support being capable of propagating internally and amplifying, through a deformation of the support, a sound wave, derived from an oscillation of the vibration chamber that reaches at least the accelerometer in such a way as to use the support as an acoustic amplifier and to excite the accelerometer according to a predetermined mechanical wave, the support comprising a box and a mobile wall for opening and closing the box, so that an access to the vibration chamber, which is disposed inside the box, is allowed,
wherein the mobile wall is linked to walls of the box by at least one electromagnetic compatibility seal when the box is closed by said mobile wall and the box has at least one wall on which the accelerometer is connected to an outside of the box and the oscillating part of the vibration chamber is connected to the inside of the box.

* * * * *